No. 782,262.  
PATENTED FEB. 14, 1905.  
F. L. MORSE.  
CONE SPROCKET WHEEL.  
APPLICATION FILED JUNE 12, 1903.

Witnesses  
J. S. Custer  
Jas. B. MacDonald

Inventor  
Frank L. Morse  
by E. Wright Att'y.

No. 782,262.  
Patented February 14, 1905.

UNITED STATES PATENT OFFICE.

FRANK L. MORSE, OF TRUMANSBURG, NEW YORK.

CONE SPROCKET-WHEEL.

SPECIFICATION forming part of Letters Patent No. 782,262, dated February 14, 1905.

Application filed June 12, 1903. Serial No. 161,231.

*To all whom it may concern:*

Be it known that I, FRANK L. MORSE, a citizen of the United States, residing in Trumansburg, county of Tompkins, State of New York, have invented a certain new and useful Improvement in Cone Sprocket-Wheels, of which improvement the following is a specification.

This invention relates to cone sprocket-wheels or pulleys for drive-chains, and has for its object to provide means whereby the drive-chain may be readily shifted from one step or diameter of the wheel to another step for the purpose of varying the speed of the drive and without stopping the chain.

Figure 1:
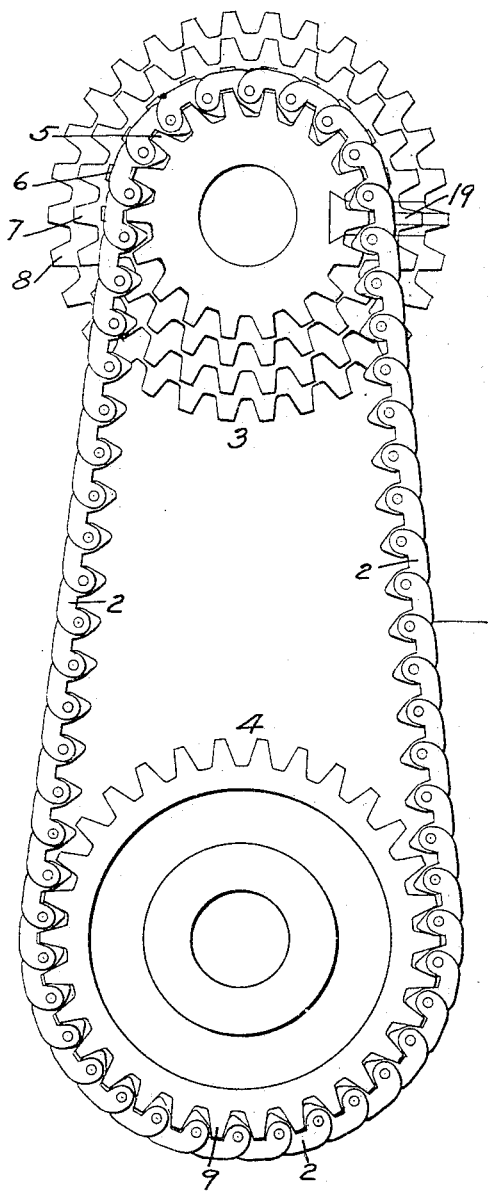
Figure 2:
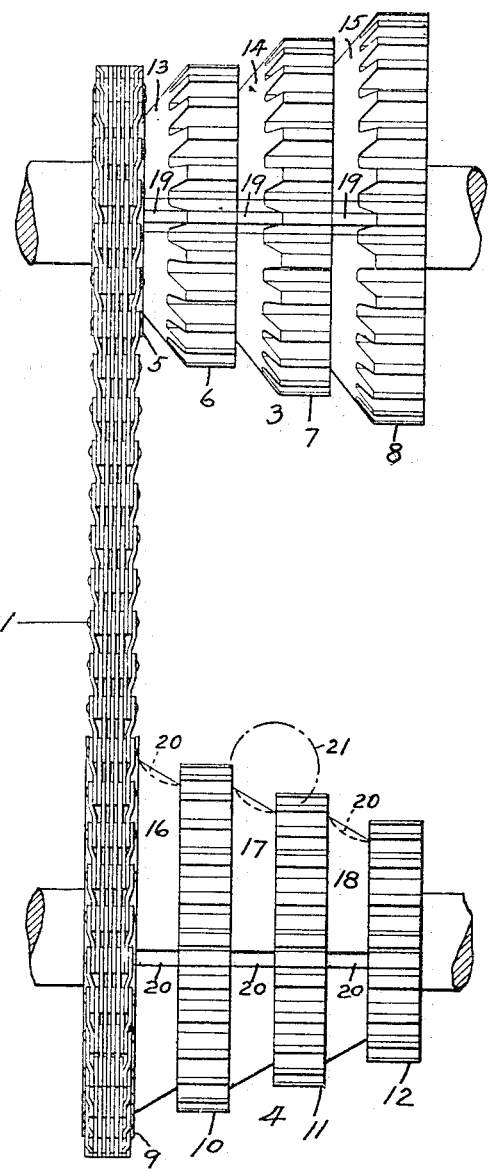

In the accompanying drawings, Figure 1 is an end view, and Fig. 2 a side view, showing a chain-drive applied to a pair of cone sprocket-wheels embodying my improvement.

In the operation of drive-chains formed of links which arch over the sprocket-teeth when it is desired to shift the chain from one step of a cone-pulley to another for the purpose of changing the speed of the drive it has heretofore been necessary to stop the chain and move the same from one set of sprocket-teeth to the other. By means of my improvement the steps or different rings of sprocket-teeth of the wheel or pulley are connected by intermediate inclined or frusto-conical surfaces provided with projections, notches, or other means for engaging the links of the chain, so as to keep the chain revolving at the same time that it runs over the conical surface when passing from one step of the sprocket-wheel to the next.

As shown in the accompanying drawings, the chain-drive comprises a chain 1, formed with arch-shaped links 2 and running upon a pair of cone-stepped sprocket-wheels 3 and 4, having the different steps or rings of sprocket-teeth 5 6 7 8 and 9 10 11 12, respectively. The steps of the wheel 3 are joined by the intermediate inclined or frusto-conical surfaces 13, 14, and 15, while the steps of the wheel 4 are joined by the frusto-conical surfaces 16, 17, and 18. On the wheel 3 the smaller ends of the frusto-conical surfaces are joined to the respective steps at substantially the base of the sprocket-teeth, while the other or larger ends extend out to the periphery of the teeth of the next step, the notches of which teeth are extended to the cone-surface. I have also shown the projection or tooth 19 located on the intermediate frusto-conical surfaces and arranged in line with the corresponding sprocket-teeth of the respective steps. It will be understood that any number of these projections or teeth may be placed around the periphery, it being preferable to provide at least three or four arranged at such points where the corresponding teeth of the respective steps substantially coincide in the same line, so that at least one of said projections will always be in engagement with an arched link of the chain while the same is moving over the intermediate conical surface from one step to another. In lieu of the additional teeth or projections notches, such as shown at 20 on the wheel 4, may be cut at the proper intervals in the conical surface to be engaged by the links of the chain. A convenient means for forming these notches is a rotary cutter, such as indicated by the dotted circular line 21. Any other means for keeping the chain revolving as it passes over the inclined surface from one step of the sprocket-wheel to another may also be used.

It will now be seen that by means of my improvement a drive-chain operating over sprocket-teeth may be manipulated in a manner very similar to a smooth belt and ordinary cone-pulleys in shifting the same from one set of steps to another for the purpose of changing the speed of the drive. The arch-shaped links of the chain allow a certain lateral movement of the chain upon the sprocket-teeth, so that when the chain is pushed laterally for changing the speed the chain slides readily onto the conical surface and being kept revolving by the notches or projections thereon readily passes to the next step of the wheel.

Having now described my invention, what I claim as new, and desire to secure by Letters Patent, is—

1. A cone sprocket-wheel comprising a plurality of steps or rings of sprocket-teeth and intermediate frusto-conical surfaces joining said steps.

2. A cone sprocket-wheel comprising a plurality of steps or rings of sprocket-teeth and intermediate frusto-conical surfaces joining said steps at the bases of said sprocket-teeth.

3. A cone sprocket-wheel comprising a plurality of steps or rings of sprocket-teeth of different diameters, and intermediate frusto-conical surfaces joining said steps and having means for engaging the links of a sprocket-chain.

4. A cone sprocket-wheel comprising a plurality of steps or rings of sprocket-teeth of different diameters, intermediate frusto-conical surfaces joining said steps at the bases of the sprocket-teeth and means on said surfaces for engaging the links of a sprocket-chain.

5. A sprocket-wheel comprising a plurality of steps or rings of sprocket-teeth of different diameters and intermediate frusto-conical surfaces joining said steps and provided with projections for engaging the links of a drive-chain.

6. A sprocket-wheel comprising a plurality of steps or rings of sprocket-teeth of different diameters, intermediate frusto-conical surfaces joining said steps and projections located on said surfaces in line with the corresponding sprocket-teeth of the respective steps.

7. In a chain-drive, the combination with a chain formed of arch-shaped links, of cone sprocket-wheels having a plurality of steps or rings of sprocket-teeth of different diameters and intermediate frusto-conical surfaces joining said steps and provided with means for engaging the arch-shaped links of the chain.

In testimony whereof I have hereunto set my hand.

FRANK L. MORSE.

Witnesses:
R. F. EMERY,
JAS. B. MACDONALD.